United States Patent [19]

Fond et al.

[11] Patent Number: 5,347,916
[45] Date of Patent: Sep. 20, 1994

[54] DEVICE TO ASSIST EXTRACTION OF BEVERAGE MATERIAL IN CARTRIDGES

[75] Inventors: Olivier Fond, Yverdon; Mario Pasquali, Vallorbe; Bernard Pierre, Yverdon, all of Switzerland

[73] Assignee: Nestec S.A., Vevey, Switzerland

[21] Appl. No.: 724,606

[22] Filed: Jul. 2, 1991

[30] Foreign Application Priority Data

Jul. 27, 1990 [EP] European Pat. Off. ......... 90114403

[51] Int. Cl.⁵ ............................................ A47J 31/24
[52] U.S. Cl. ................................. 99/295; 99/302 R
[58] Field of Search ............ 99/279, 295, 300, 302 R, 99/306, 307, 316, 317

[56] References Cited

U.S. PATENT DOCUMENTS

| | | |
|---|---|---|
| 2,899,886 | 8/1959 | Rodth . |
| 2,968,560 | 1/1961 | Goros . |
| 3,811,373 | 5/1974 | Telco ............................. 99/295 |
| 3,878,772 | 4/1975 | Nordskog ....................... 99/295 |
| 4,080,299 | 3/1978 | Bartolome ..................... 99/295 |
| 4,149,454 | 4/1979 | Kemp ............................ 99/295 |
| 4,520,716 | 6/1985 | Hayes ........................... 99/295 |
| 4,550,024 | 10/1985 | le Granse ..................... 99/295 |
| 4,697,503 | 10/1987 | Okabe .......................... 99/306 |
| 4,739,697 | 4/1988 | Roberts ........................ 99/295 |
| 4,765,896 | 8/1988 | Hartley ........................ 99/317 |
| 4,846,052 | 7/1989 | Favre ........................... 99/295 |
| 4,853,234 | 8/1989 | Bentley ........................ 99/279 |
| 4,995,310 | 2/1991 | van der Lijn ................. 99/295 |

FOREIGN PATENT DOCUMENTS 2213560 9/1973 Fed. Rep. of Germany ........ 99/279

*Primary Examiner*—David A. Scherbel
*Assistant Examiner*—Randall E. Chin
*Attorney, Agent, or Firm*—Vogt & O'Donnell

[57] ABSTRACT

A device for assisting extraction of a material contained in a cartridge for preparation of a beverage has a wall which forms a hollowed enclosure which has an interior surface which defines a frustoconically shaped cavity for containing the cartridge. A rim intersects and extends laterally from the interior surface of the wall to form a peripheral rim base surface which intersects the wall for supporting a cartridge contained by the interior wall surface. A plurality of fins integral with the rim extend from the rim laterally, with respect to the interior wall surface, to converge and connect at an area which is centrally disposed, with respect to the interior wall surface and rim, and displaced at a distance away from a plane defined by the intersection of the interior wall and rim base surfaces so that the area of convergence is displaced away from a cartridge contained and supported by the wall and rim base surfaces. A finger is disposed centrally in the area of convergence of the fine and extends towards the plane.

12 Claims, 2 Drawing Sheets

DEVICE TO ASSIST EXTRACTION OF BEVERAGE MATERIAL IN CARTRIDGES

This invention relates to an adaptable insert for a cartridge holder for the preparation of beverages in a coffee machine.

There are several reasons for the use of coffee capsules, above all in the field of espresso type coffees which are extracted under pressure, namely: hygiene, optimal storage of the coffee, ease of use, better control of the quality of the coffee obtained and good reproducibility of the extraction conditions. Among the number of capsules available, only sealed capsules which open under the pressure of the water injected respond more completely to the arguments listed above. These capsules are distinguished by their opening system.

The capsules according to CH 605 293 have weakened zones which tear preferentially under the effect of pressure. This solution has the disadvantage of increasing the complexity and price of the capsule because the materials used have to be treated very precisely to ensure that the capsules open correctly and reproducibly.

SUMMARY OF THE INVENTION

The present invention relates to an adaptable insert device for a cartridge holder for the extraction of capsules with no weakening zone.

The present invention relates to an adaptable insert device for a cartridge holder for the preparation of beverages in a coffee machine, wherein the device defines a recess cavity substantially frustoconical in shape and has a lower peripheral rim for receiving and supporting cartridge a beverage material to be extracted and, beneath this recess, a fixed central finger.

DETAILED DESCRIPTION OF THE INVENTION

In the context of the invention, "substantially frustoconical" is understood to mean both frustoconical in the strict sense and frustoellipsoidal, frustospherical or even cylindrical.

The cartridge used is frustoconical in shape corresponding to the recess of the insert with a diameter of 2.5 to 6 mm and a thickness of the coffee layer of 10 to 25 mm. It is made of aluminium or plastic with a filter on its lower face.

The advantage of the presence of the peripheral rim in the insert device is that it acts as a support for the lower face of the capsule and, during its extraction, guarantees a good position of the filter so that it is able to perform its function throughout the extraction process. This rim normally has a width of 1 to 4 mm.

The capsule is extracted by the process according to applicants' European patent application filed on the same date as the present application under the title "A process and a device for the extraction of sealed cartridges" (EP 90114401.4).

The fixed central finger is a cylindrical or cylindroconical element (circular or oval cross-section) which when placed beneath a face of a capsule containing beverage material to be extracted produces, during extraction, a local concentration of tension in the lower face and promotes perfectly controlled opening of the adjacent face of the capsule. This finger is between 2 and 10 mm in diameter and the upper face of the finger is situated at a distance of 0 to 5 mm from the plane formed by the rim zone supporting the lower face of the capsule in the insert.

The insert device has radial fins around the fixed central finger beneath the recess. The radial fins are 3 to 8 in number and vary from 0.5 to 2 mm in thickness. They are slightly rounded in shape in order not to tear the adjacent face of the cartridge to be extracted. To ensure good flow of the coffee extract, the upper edge of the radial fins forms an angle of 5° to 20° with the horizontal. The exact definition of this angle will be given with reference to the drawings. The function of the fins is to provide an additional support for the filter while at the same time allowing good removal of the coffee extract through the opening formed in the adjacent face of the capsule.

The insert device is an interchangeable element which fits into a conventional cartridge holder for coffee machines. The dimensions of the inner recess vary according to the type of cartridge to be extracted.

The invention thus provides various insert devices which enable different capsules of various sizes to be used in the same coffee machine and with the same cartridge holder. This insert device is only conceivable because a versatile extraction device is also available, enabling various capsules to be extracted under good conditions. This extraction device is the subject of applicants' European patent application filed on the same date as the present application under the title "A device for the extraction of sealed cartridges" (EP 90114402.2). The extraction process normally takes place under a pressure of 2 to 20 bar.

The insert device according to the invention is between 30 and 70 mm in diameter and between 10 and 30 mm in height. It is normally made of metal, but may also be made completely or partly of plastic.

The imperviousness of the insert device is guaranteed by compression of the rim of the capsule between the upper flange of the insert and the extraction device.

The invention is described in more detail in the following with reference to the accompanying drawings. wherein

DETAILED DESCRIPTION OF THE DRAWINGS

Figure 1:
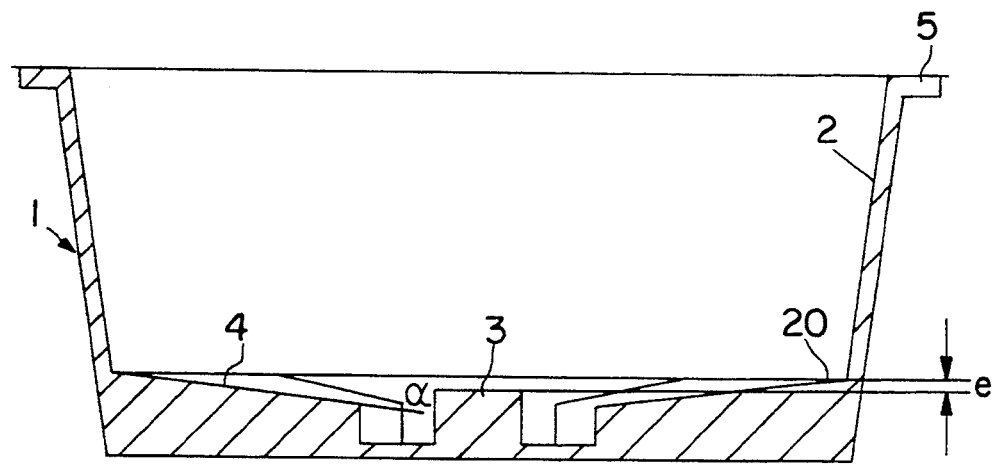
FIG. 1 is a section through the insert device according to the invention.

The insert device (1) defines a recess cavity contained by the interior surface of peripheral wall enclosure (2) for the cartridge and beneath this recess, a central finger (3) and six radial fins (4) and an upper flange (5) which, during extraction, rests on a corresponding rim (6) of the cartridge holder (7). At the bottom of the recess cavity contained by the interior surface of peripheral wall enclosure (2) is a rim (20) on which rests the lower wall of the capsule containing beverage material to be extracted. This rim (20) is situated at a distance e from the upper face of the finger (3). The distance e is between 0 and 5 mm. The fins (4) form an angle α with the horizontal. This angle is between 5 and 20°.

Figure 3:
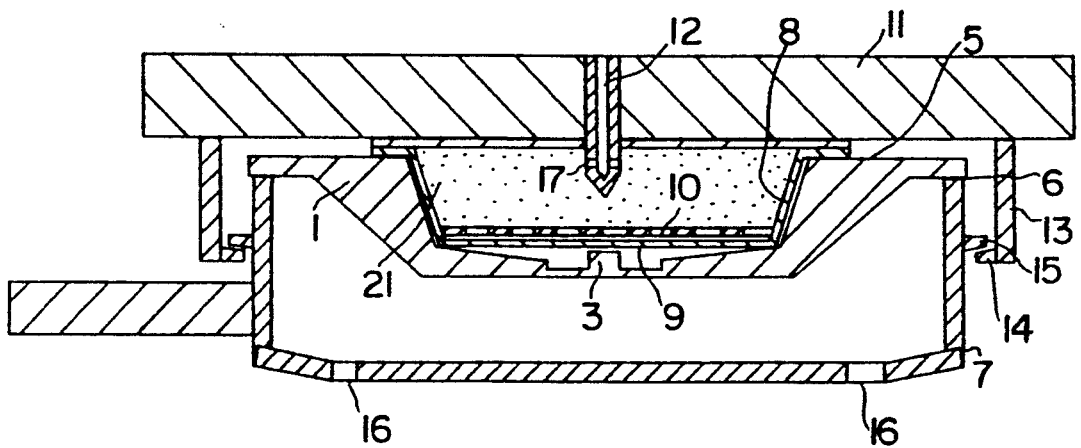
FIGS. 3, 4 and 5 are sections through various insert devices in the same extraction system.
Figure 4:
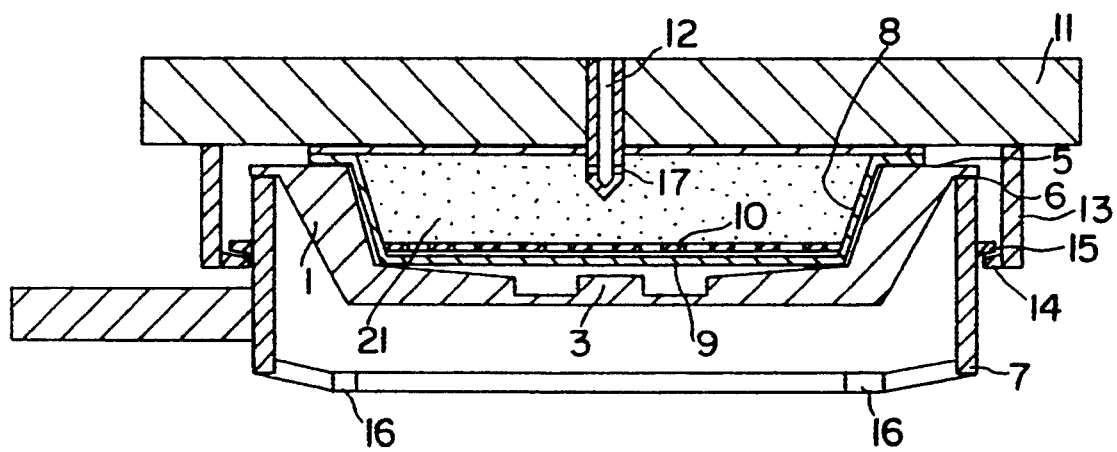
Figure 5:
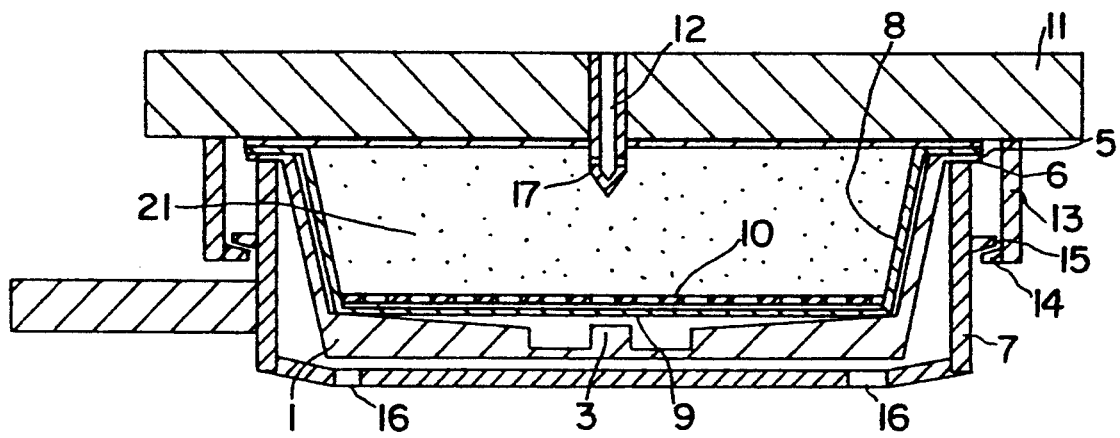
Figure 1:
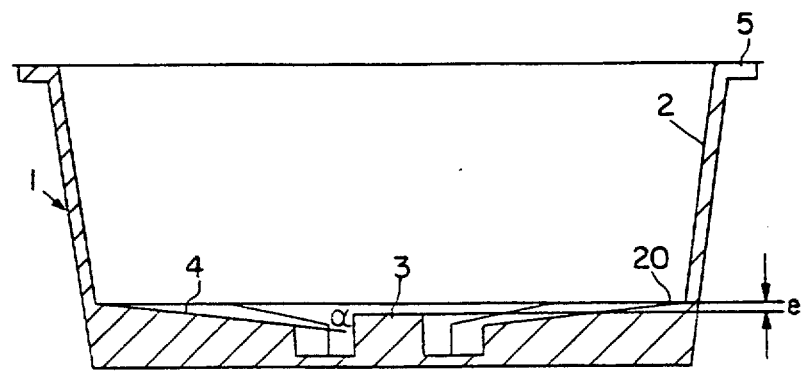
Figure 2:
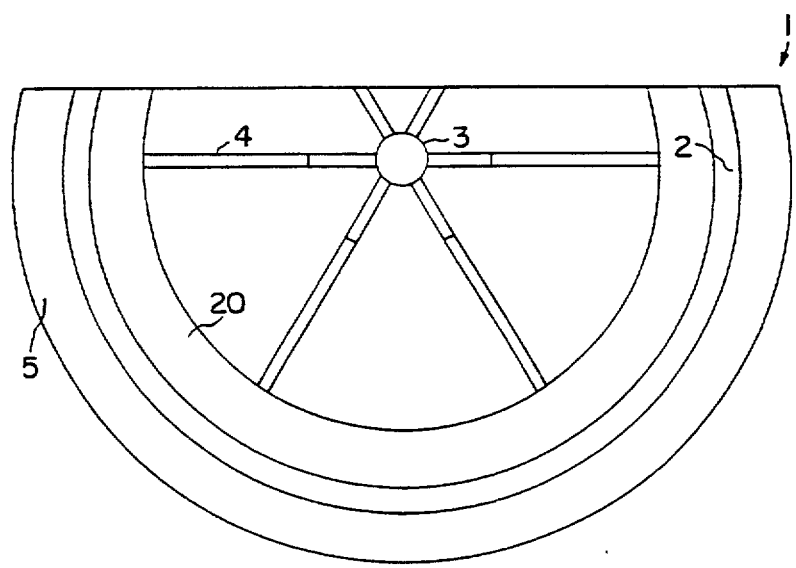

FIGS. 3 to 5 show three different inserts with which cartridges (8) varying in size and containing the coffee (21) are extracted. The cartridges comprise lower faces (9) and filters (10) which rest on the rim (20).

The extraction system Ill) comprises a water injector (12) and a tightening ring (13) with tightening ramps (14). The cartridge holder (7) comprises two retaining lugs (15) which are designed to cooperate with the ramps (14) and orifices (16) for receiving the coffee after extraction of the cartridge (8).

As can be seen from the drawing Figures, the wall (2), which has an interior surface which forms a hollowed enclosure, extends to a peripheral rim base surface, or zone, (20) which intersects and extends laterally from the interior wall surface of wall enclosure (2) and supports a cartridge contained by the wall. A plurality of fins (4) integral with the rim extend laterally, with respect to the interior wall surface, to converge and connect at an area which is disposed centrally with respect to the interior wall surface and rim. As may be seen most easily in FIG. 1, the area of convergence is displaced at a distance away from a plane defined by the intersection of the interior wall and rim base surfaces and thereby away from a cartridge contained and supported by the interior wall and rim base surfaces. Finger 3 is disposed centrally in the area of convergence of the fins and extends towards the plane but does not intersect the plane.

In operation, as may be seen best in FIGS. 3–5, cartridge (8) is placed in the insert device (1) which is introduced into the cartridge holder (7). The cartridge holder is then engaged in the tightening ring (13), and the water injector (12) pierces the upper wall of the cartridge (8).

The water arrives through the orifices (17) of the water injector and wets the entire layer of coffee. Under the effect of the water pressure, the lower face (9) of the cartridge deforms and is applied against the adjacent central finger (3). The lower face tears on reaching its yield stress. The filter (10) also deforms, but is of such a thickness that it does not tear. The actual extraction process can then begin. The liquid flows through the orifices (16) and the pressure builds up in the capsule. The beverage is collected in a receptacle (not shown). A cartridge is extracted in a reduced time and a beverage having all the characteristics of an espresso coffee is obtained.

We claim:

1. A device for assisting extraction of a material contained in a cartridge for preparation of a beverage comprising:

a wall which forms a hollowed enclosure and which has an interior surface which defines a frustoconically-shaped cavity for containing a cartridge containing a material to be extracted for preparation of a beverage;

a rim which intersects and extends laterally from the interior surface of the wall to form a peripheral rim base surface for supporting a cartridge contained by the interior wall surface;

a plurality of fins, an area of fin convergence and a finger, wherein the fins are integral with and extend from the rim laterally, with respect to the interior wall surface, and have edges facing the cavity which extend from the rim base surface and converge and connect at an area of fin convergence so that the area of fin convergence is centrally disposed with respect to the interior wall surface and rim and displaced at a distance away from a plane defined by the intersection of the interior wall surface and rim base surface and wherein the finger extends from the area of fin convergence towards the plane to a finger surface located below the plane and being displaced a distance away from a portion of the fin edges adjacent the area of fin convergence.

2. A device according to claim 1 wherein the finger extends to within a distance of from 0 to 5 mm of the plane.

3. A device according to claim 1 wherein the finger is circular in a cross-section parallel to the plane.

4. A device according to claim 1 wherein the finger is oval in a cross-section parallel to the plane.

5. A device according to claim 3 or 4 wherein the cross-section has a length of from 2 mm to 10 mm.

6. A device according to claim 5 wherein the finger extends to within a distance of from 0 to 5 mm of the plane and each fin has a thickness of from 0.5 mm to 2 mm.

7. A device according to claim 1 wherein there are from 3 to 8 fins.

8. A device according to claim 1 wherein the fin edges facing the cavity extend from the rim base surface to form an angle of from 5° to 20° with respect to the plane.

9. A device according to claim 1 wherein the rim surface has a width of from 1 mm to 4 mm.

10. A device according to claim 1 wherein the fin edges facing the cavity extend from the rim base surface to form an angle with respect to the plane.

11. A device according to claim 1 wherein the fin edges facing the cavity are configured in two portions, wherein a first portion is adjacent the area of fin convergence and forms a recess between the finger and a second fin edge portion which extends to the rim base suface.

12. A device for assisting extraction of a material contained in a cartridge for preparation of a beverage consisting of a wall, a flange connected to an upper portion of the wall, a rim, a plurality of fins, an area of fin convergence and a finger wherein:

the wall forms a hollowed enclosure and has an interior wall surface which defines a frustoconically-shaped cavity having an opening surrounded by the flange for containing a cartridge containing a material to be extracted for preparation of a beverage;

the flange intersects and extends laterally from the wall about and away from the opening;

the rim intersects and extends laterally from the interior wall surface to form a peripheral rim base surface for supporting a cartridge contained by the interior wall surface;

the fins are integral with the rim and extend from the rim laterally, with respect to the interior wall surface, and have edges facing the cavity which extend from the rim base surface and converge and connect at the area of fin convergence so that the area of fin convergence is centrally disposed with respect to the interior wall surface and rim and displaced at a distance away from a plane defined by the intersection of the interior wall surface and rim base surface; and the finger extends from the area of fin convergence towards the plane to a finger surface located below the plane and being displaced a distance away from a portion of the fin edges adjacent the area of fin convergence.

* * * * *

UNITED STATES PATENT AND TRADEMARK OFFICE
CERTIFICATE OF CORRECTION

PATENT NO. : 5,347,916
DATED : September 20, 1994
INVENTOR(S) : Olivier FOND, et al.

It is certified that error appears in the above-indentified patent and that said Letters Patent is hereby corrected as shown below:

On title page, item [57] Abstract, line 18, (next-to-last line), "fine" should be --fins--.

Column 2, line 20, delete "various".

Column 2, line 41, delete "wherein".

Signed and Sealed this

Twenty-ninth Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,347,916
DATED : September 20, 1994
INVENTOR(S) : Olivier FOND, et al.

Figure 2:
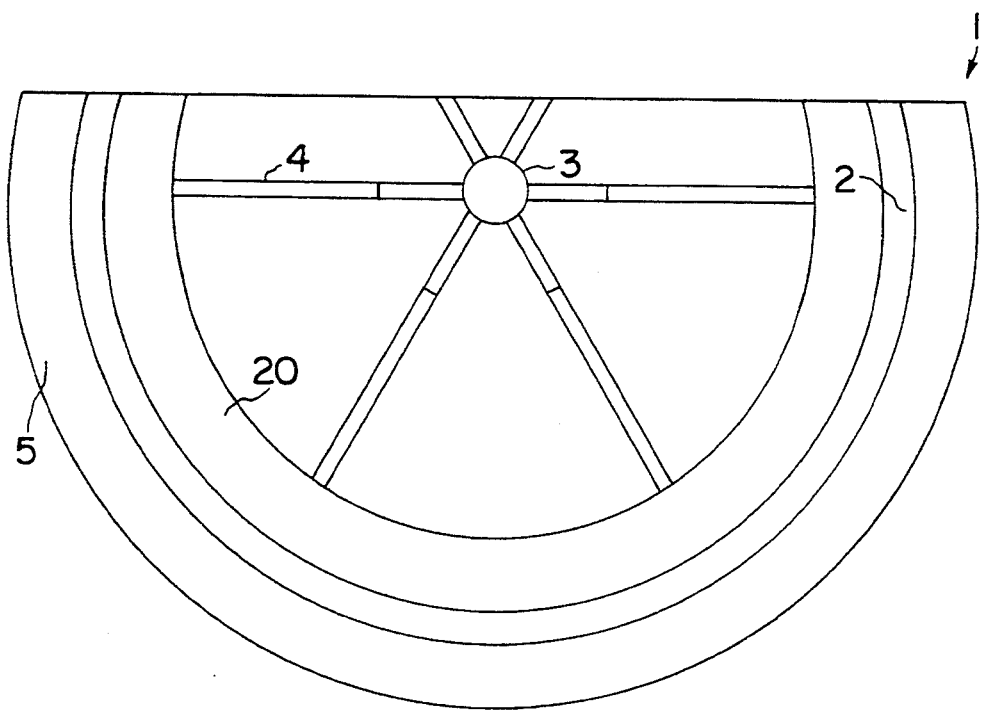
FIG. 2 is a plan view of FIG. 1.

It is certified that error appears in the above-indentified patent and that said Letters Patent is hereby corrected as shown below:

Figures 1 and 2 should be added, to appear as per the attached Figures 1 and 2.

Signed and Sealed this

Thirteenth Day of June, 1995

*Attest:*

BRUCE LEHMAN

*Attesting Officer*     *Commissioner of Patents and Trademarks*